United States Patent
Manovit et al.

(10) Patent No.: US 7,814,378 B2
(45) Date of Patent: Oct. 12, 2010

(54) VERIFICATION OF MEMORY CONSISTENCY AND TRANSACTIONAL MEMORY

(75) Inventors: Chaiyasit Manovit, Mtn. View, CA (US); Sudheendra G. Hangal, Bangalore (IN)

(73) Assignee: Oracle America, Inc., Redwood City, CA (US)

(*) Notice: Subject to any disclaimer, the term of this patent is extended or adjusted under 35 U.S.C. 154(b) by 244 days.

(21) Appl. No.: 11/750,671

(22) Filed: May 18, 2007

(65) Prior Publication Data
US 2008/0288834 A1    Nov. 20, 2008

(51) Int. Cl.
*G11C 29/00* (2006.01)
*G06F 11/00* (2006.01)
*G06F 12/00* (2006.01)

(52) U.S. Cl. .................. 714/718; 714/38; 711/154; 711/141

(58) Field of Classification Search .......... 714/25, 714/33, 37, 38, 703, 742, 799, 718; 711/154, 711/141; 703/2, 21, 22; 716/4; 712/30
See application file for complete search history.

(56) References Cited

U.S. PATENT DOCUMENTS

| | | | |
|---|---|---|---|
| 5,692,153 A * | 11/1997 | Malik et al. ............... | 711/141 |
| 6,892,286 B2 * | 5/2005 | Hangal et al. ............. | 711/154 |
| 7,024,600 B2 | 4/2006 | Manley et al. | |
| 7,305,649 B2 | 12/2007 | Bellas et al. | |
| 7,398,515 B2 | 7/2008 | Atoji et al. | |
| 2003/0237032 A1* | 12/2003 | Adler et al. ............... | 714/718 |
| 2004/0064656 A1 | 4/2004 | Hangal et al. | |

OTHER PUBLICATIONS

"The Complexity Of Sequential Consistency", P.B. Gibbons and E. Korach, Proc. 4th IEEE Symposium on Parallel and Distributed Processing, 1992, pp. 317-325.

"TSOtool: A Program for Verifying Memory Systems Using the Memory Consistency Model", S. Hangal, D. Vahia, C, Manovit, J. Lu, and S. Narayanan, 31st Annual Internal Symposium on Computer Architecture (ISCA) 2004.

"Verifying Sequential Consistency Using Vector Clocks", Harold W. Cain and Mikko H. Lipasti, Proc. 14th Symposium on Parallel Algorithms and Architectures (SPAA) Revue, Aug. 2002.

(Continued)

*Primary Examiner*—Phung M Chung
(74) *Attorney, Agent, or Firm*—Rory D. Rankin; Meyertons, Hood, Kivlin, Kowert & Goetzel, P.C.

(57) ABSTRACT

A system for efficiently verifying compliance with a memory consistency model includes a test module and an analysis module. The test module may coordinate an execution of a multithreaded test program on a test platform. If the test platform provides an indication of the order in which writes from multiple processing elements are performed at shared memory locations, the analysis module may use a first set of rules to verify that the results of the execution correspond to a valid ordering of events according to a memory consistency model. If the test platform does not provide an indication of write ordering, the analysis module may use a second set of rules to verify compliance with the memory consistency model. Further, a backtracking search may be performed to find a valid ordering if such ordering exists or show that none exists and, hence, confirm whether or not the results comply with the given memory consistency model.

20 Claims, 11 Drawing Sheets

OTHER PUBLICATIONS

"On testing Cache-Coherent Shared Memories", P.B. Gibbons and E. Korach, SPAA 1994, pp. 177-188.

"The Complexity Of Verifying Memory Coherence", J.F.Cantin, M.H.Lipasti and J.E.Smith, SPAA 2003, pp. 254-255.

"Verification Methods For Weaker Shared Memory Consistency Models", Proceedings of the 15th IPDPS 2000 Workshops on Parallel and Distributed Processing.

"An Executable Specification, Analyzer and Verifier for RMO (Relaxed Memory Order)", S. Park, D.L. Dill, SPAA 1995, pp. 34-41.

"The SPARC Architecture Manual, Version 9", SPARC International, Inc., David Weaver and Tom Germond (Editors), 1994, pp. 119-132.

U.S. Appl. No. 11/137,755 filed May 25, 2005; Entitled "System and Method for Efficient Verification of Memory Consistency Model Compliance"—Manovit, et al.

* cited by examiner

Example Total Operation Ordering After Using Heuristic: (S[B]#3,S[A]#1,L[B]#3,S[B]#4,S[A]#2,L[B]#4)

```
┌─────────────────────────────────────────────────────────────┐
│  Divide Operation Stream For Each Processing Element Into Two │
│  "Virtual SC" Operation Streams: A Load Stream And A Store Stream │
│                            701                               │
└─────────────────────────────────────────────────────────────┘
                              │
                              ▼
┌─────────────────────────────────────────────────────────────┐
│      Maintain Reverse Time Vector Clock Values For Each Node │
│                            706                               │
└─────────────────────────────────────────────────────────────┘
                              │
                              ▼
┌─────────────────────────────────────────────────────────────┐
│                 Add Static Edges, Observed Edges             │
│                            711                               │
└─────────────────────────────────────────────────────────────┘
                              │
                              ▼
┌─────────────────────────────────────────────────────────────┐
│  Iteratively Add Edges And Check For Cycles, Use Reverse Time │
│    Vector Clock Values To Limit Graph Traversals,, Update    │
│       Reverse Time Vector Clocks As New Edges Are Added      │
│                            716                               │
└─────────────────────────────────────────────────────────────┘
```

FIG. 7

VERIFICATION OF MEMORY CONSISTENCY AND TRANSACTIONAL MEMORY

BACKGROUND OF THE INVENTION

1. Field of the Invention

This invention relates to the field of computer systems, and more particularly to verification of compliance with memory consistency models for multiprocessor systems.

2. Description of the Related Art

Shared memory multiprocessor computer system architectures have become a common solution for complex computing needs, such as are often encountered in computer network servers and telecommunications applications. A typical shared memory multiprocessor computing system includes two or more processors that access shared memory. The same physical address on different processors typically refers to the same location in the shared memory. In shared memory architectures, a memory consistency model typically specifies the semantics of memory operations to coordinate accesses by multiple processors to the shared memory. A memory model effectively establishes a contract between the programmer and the hardware. Thus, both programs and hardware in a shared memory multiprocessor system must be correct with respect to the memory model definition for proper operation. Memory models can have a significant impact on ease of programming and optimizations performable by the hardware or the compiler.

One example of a memory consistency model is the Total Store Order ("TSO") memory model developed by Sun Microsystems, Inc. The TSO memory model specification defines the semantics of load, store and atomic memory operations (such as swap operations) in uniprocessor or multiprocessor systems from the point of view of program results. TSO defines two types of orders over the set of memory operations: a per processor program order denoting the sequence in which the processor logically executes instructions, and a global memory order conforming to the order in which operations are performed at the memory.

Memory operations are ordered by six TSO axioms: the Order, Atomicity, Termination, LoadOp, StoreStore and Value axioms. The Order axiom requires that there is a total order over all stores. The Atomicity axiom requires that there be no intervening stores between a load component and a store component of an atomic memory operation such as a swap. The Termination axiom requires that all stores and swaps eventually terminate. That is, if one processor of a multiprocessor does a store to a particular memory location and another processor repeatedly does loads to read the particular memory location, there will eventually be a load that reads the value stored by the first processor. The LoadOp axiom requires that if an operation follows a load in per processor program order, then the operation must also follow the load in global memory order. The StoreStore axiom requires that if two stores appear in a particular order in per processor program order, then they must also appear in the same order in global memory order. Informally, the LoadOp and StoreStore axioms together imply that under TSO, the only kind of reordering allowed between operations on the same processor is for loads to overtake stores, i.e., a load which succeeds a store in program order may precede it in global order. The Value axiom requires that the value returned by a load from a particular memory location is the value written to that memory location by the last store in global memory order, among the set of stores preceding the load in either global memory order or program order. The Value axiom allows a load to read the value written by an earlier store on the same processor, before that store has completed in global order. This permits processor implementations with store buffers, for example, to locally bypass data from a store to a load, before the store is globally visible. In a multiprocessor supporting the TSO memory consistency model, a violation of a TSO axiom by a sequence of memory operations may indicate a design problem or bug.

One difficulty with advanced shared memory multiprocessor architectures is that design problems or bugs are difficult to find, isolate and correct. The memory subsystem is among the most complex parts of modern multiprocessor architectures, especially of architectures employing chip multiprocessing (CMP) or simultaneous multithreading (SMT), and therefore among the most bug-prone. Undetected bugs result in improper operations that often lead to system failures and that delay new design releases or, worse, require post-release patches. It is often difficult to determine the validity of program execution results in the presence of race conditions. Since the results of the program may be timing-dependent, multiple legal outcomes may exist, and a simple architectural model of the multiprocessor may not be sufficient to verify that the results comply with the memory consistency model. Existing techniques to verify program execution results may sometimes require analysis steps with relatively high levels of computational complexity. As a result, cost and time constraints associated with typical processor design cycles may tend to limit the use of the existing techniques to relatively small programs and/or relatively small multiprocessors.

SUMMARY

Various embodiments of a system and method for efficiently verifying compliance with a memory consistency model are disclosed.

In one embodiment, a system includes a test module and an analysis module. The test module may be operable to coordinate an execution of a multithreaded test program on a test platform that includes multiple processing elements (e.g., multiple processors or multiple processor cores). The test platform may include multiprocessor computer system hardware, or a simulation or emulation of a multiprocessor computer system or a memory subsystem in other embodiments. The results of the program execution, which may include per-processing element memory operation sequences, may be provided to the analysis module. If the test platform provides visibility into the order in which writes from multiple processing elements are performed at shared memory locations, the analysis module may use a first set of rules to verify that the results of the execution correspond to a valid ordering of events according to a memory consistency model. For example, if the test platform is a simulation model, a total write order may be provided for each shared memory location written to during the test as part of the simulation results. If, however, the test is run on a test platform that does not provide an indication of write ordering, as may be the case if the test platform is an actual multiprocessor system, the analysis module may use a second set of rules to verify compliance with the memory consistency model. There may be a tradeoff between the level of detail available from the test platform and the efficiency and completeness with which memory consistency model verification can be accomplished.

In one embodiment, the analysis module may be operable to represent memory operations (e.g., loads and stores) performed during the execution as nodes of a directed graph. Edges between the nodes may be added by the analysis module to represent ordering relationships between the memory operations. A number of different types of edges may be added, corresponding to the axioms of the memory consistency model and the amount of detail (e.g., total write ordering information) provided by the test platform. Some of the edges may be added in iterations, where additional edges may be inferred within each new iteration, based on a traversal of existing edges in a current version of the graph. Additionally, a backtracking procedure may be utilized to return to a previous choice point and make a different choice. In this manner, further edges may be added and considered. A cycle in the directed graph may represent a violation of the memory consistency model, as it may represent an order of memory operations that violates the axioms of the model.

In a further embodiment, a transactional memory is contemplated wherein axioms regarding transactions are utilized to establish a framework and aid in memory consistency verification. Using this framework, a pseudo-random testing methodology is implemented for TM systems and efficient analysis algorithms based on this framework.

These and other embodiments will be further appreciated upon reference the following description and drawings.

BRIEF DESCRIPTION OF THE DRAWINGS

FIG. 7 is a flow diagram illustrating aspects of the operation of an analysis module according to one embodiment where vector clocks are employed.

Figure 1:
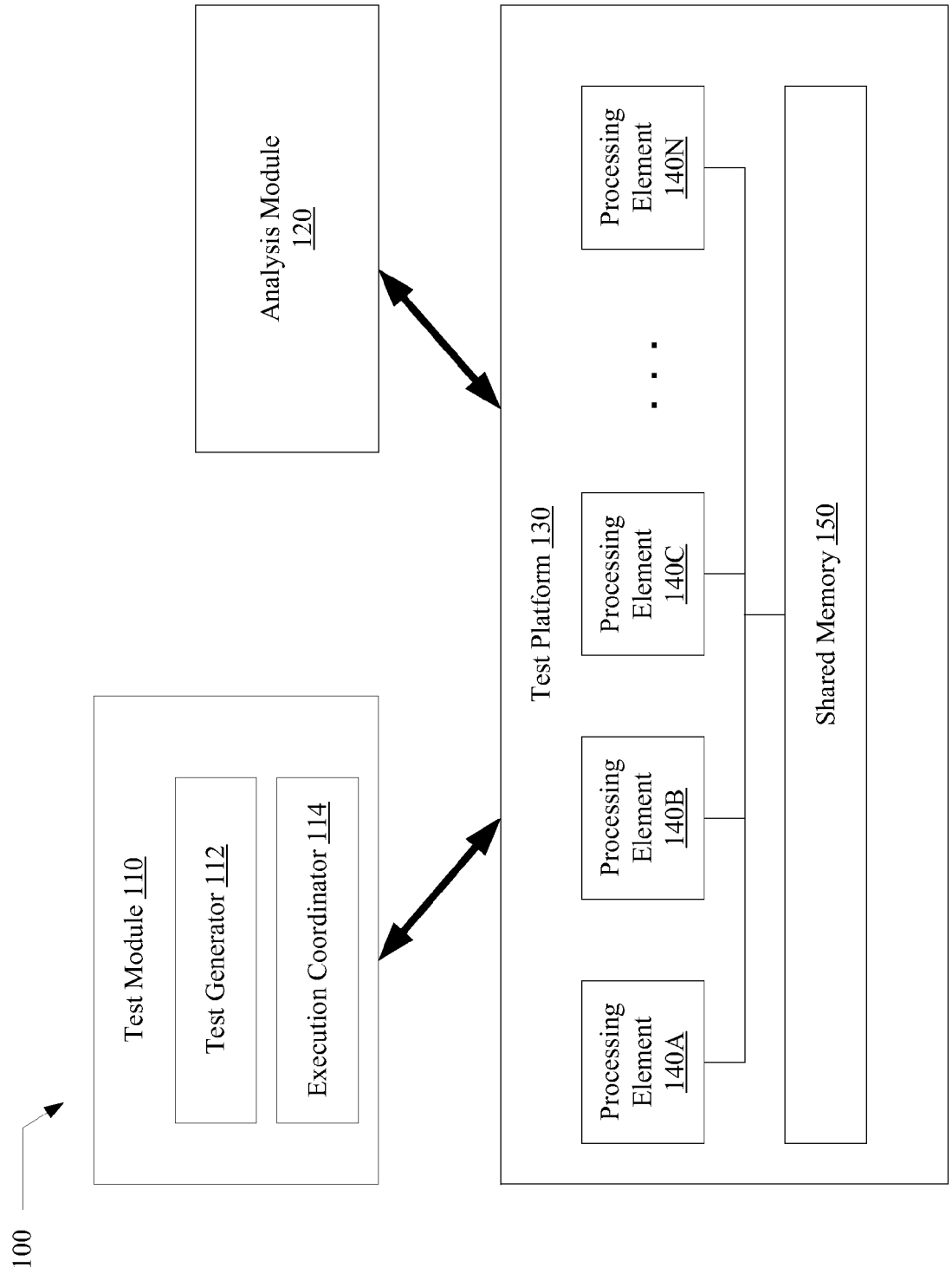
FIG. 1 is a block diagram of a system, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram of one embodiment of a system 100. System 100 includes a test module 110, an analysis module 120 and a test platform 130. Test module 110 and analysis module 120 may be operable to use test platform 130 to test whether a sequence of memory operations performed in a shared memory multiprocessor computer system violate a memory consistency model (e.g., the Total Store Order or TSO memory consistency model from Sun Microsystems Inc.). In the illustrated embodiment, for example, test platform 130 may include a plurality of processing elements 140A-140N (collectively, processing elements 140) and a shared memory 150. In some embodiments, test platform 130 may comprise the actual hardware of a shared memory multiprocessor computer system, where, for example, each processing element 140 is a processor or a processing core on a multi-core processor chip. In other embodiments, test platform 130 may comprise a simulation model, e.g., a simulation model of a memory subsystem, or a simulation model of a shared memory multiprocessor computer system. Test module 110 may be operable to coordinate an execution of a multithreaded test program on test platform 130. Analysis module 120 may be operable to use one or more sets of rules to verify that the results of the execution of the multithreaded test program correspond to a valid order of events according to the memory consistency model. Further details on the design and generation of the multithreaded test program, and the components and functionality of the test module, in various embodiments are provided below.

In some embodiments analysis module 120 may use the rules to develop a graphical representation of the execution of memory operations of the multithreaded test program, and to search for patterns (e.g., cycles in a directed graph) that may indicate a violation of the memory consistency model. In one embodiment, the specific rules used by analysis module 120 to verify compliance with the memory consistency model may vary as a function of the level of detail provided by test platform 130 about the relative sequence of memory operations performed during the test program execution. For example, in some cases, such as when a simulation model is used as the test platform 130, a total ordering of write operations to each memory location written to during the test program may be provided as part of the simulation results. In some embodiments, analysis module 120 may use a first set of rules where such a total ordering is provided, and may use a different set of rules if the total ordering is not provided (e.g., if the test is run on an actual implementation of a multiprocessor system where it may not be possible to capture write order for each memory location modified during the test, or where the test execution may be perturbed to an unacceptable degree if write ordering information is gathered for each memory location). The rules used for analysis when a total ordering of writes is available may result in a more efficient and/or a more complete verification of compliance with the memory consistency model than the rules used when total write ordering information for each memory location is not available. In addition, in some embodiments, analysis module 120 may also be operable to use one or more optimizations, such as a vector clock technique or a heuristic based on possible write ordering sequences, to reduce the time taken to complete memory consistency model verification. Further details of the different types of rules that may be used by analysis module 120, as well as the optimizations performed in different embodiments, are provided below.

As noted above, in some embodiments test platform 130 may include an actual multiprocessor computer system, which may for example run an operating system in addition to the multithreaded test program. The execution of operating system operations (and/or the presence of other external perturbations) in conjunction with the test program may affect the results of the test program in some embodiments—for example, memory-related operating system activities may affect the timing of memory operations performed during the test. As a result, in such embodiments the results of the memory model compliance analysis performed by analysis module 120 may be applied only to specific test runs (i.e., the analysis results may change if the test is repeated). Multiple test and analysis runs or repetitions may therefore be performed in such embodiments. In other embodiments, test platform 130 may include simulation models at any desired level of abstraction, such as architectural models, RTL (Register Transfer Level) models, or gate-level models. The simulation may encompass only the units of a memory subsystem in some embodiments, e.g., the model may include only shared memory 150 and its interactions with processing elements 140, or may include additional elements of the multiprocessor computer system. Any desired combination of software simulators, hardware accelerators or FPGA (Field Programmable Gate Array) based emulators may be used in test platform 130 in different embodiments.

Figure 2:
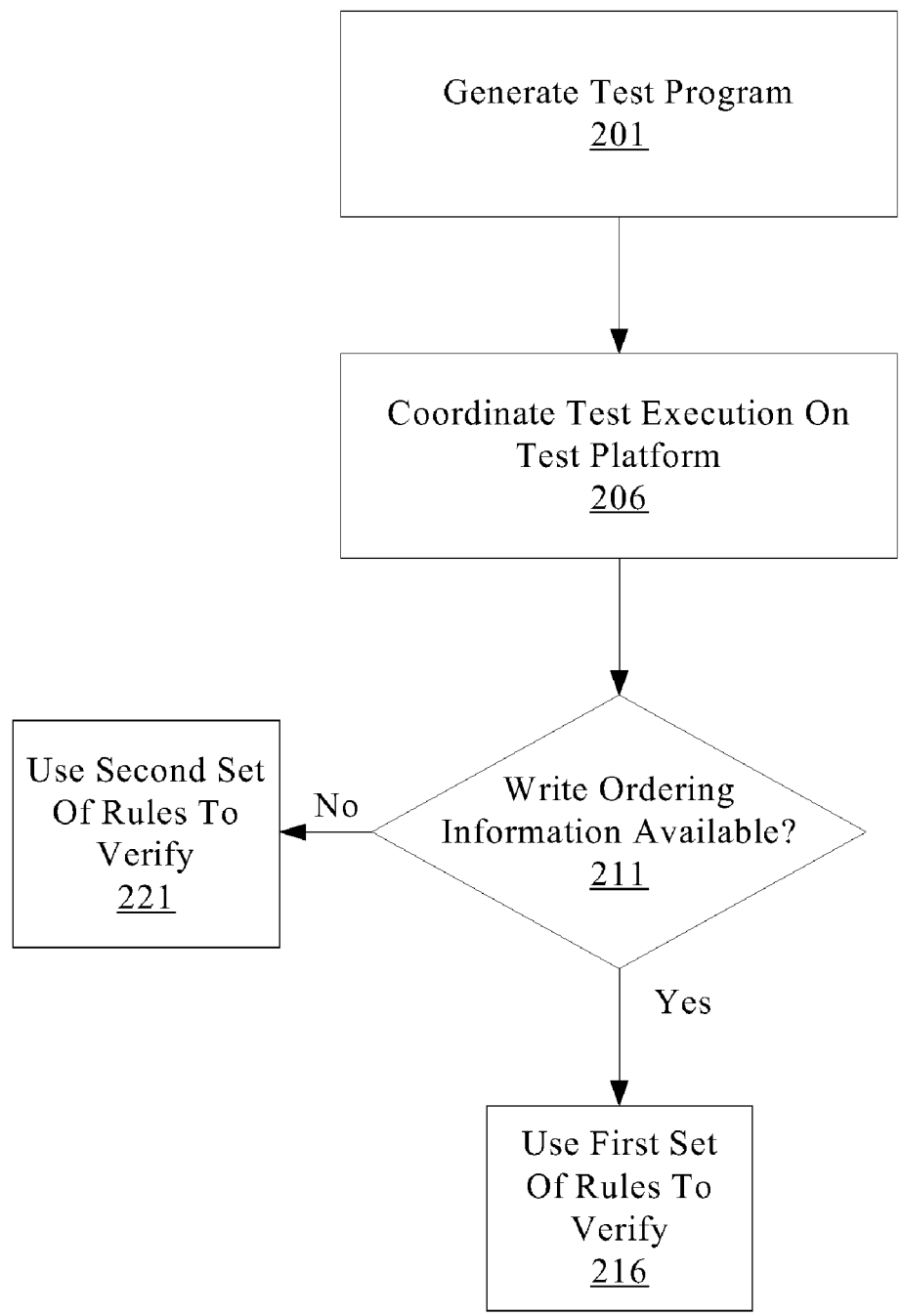
FIG. 2 is a flow diagram illustrating aspects of the operation of a test module and an analysis module, according to one embodiment.

FIG. 2 is a flow diagram illustrating aspects of the operation of test module 110 and analysis module 120, according to one embodiment. As shown in blocks 201 and 206 of FIG. 2, test module 110 may be configured to generate the multithreaded test program and to coordinate the execution of the test program on the test platform 130. In one embodiment, as illustrated in FIG. 1, test module 110 may comprise a test generator 112 and an execution coordinator 114. Test generator 112 may be configured to generate the multithreaded test program to be executed on test platform 130, while execution coordinator 114 may be responsible for managing the execution itself—e.g., for starting and stopping the execution, obtaining intermediate and final results, etc. Further details about the functionality of test generator 112 and execution coordinator 114 are provided below.

The results of the execution of the test program may be provided to analysis module 120. In one embodiment, if write ordering information (e.g., a total ordering of writes at each memory location written to during the test program) is available (as detected in decision block 211 of FIG. 2), analysis module 120 may use a first set of rules to verify whether the execution results correspond to a valid ordering of events according to a specified memory consistency model (block 216). If the write ordering information is not available, analysis module may use a second set of rules to verify whether the execution results conform to the memory consistency model (block 221). The techniques illustrated in FIG. 2 may be used to verify compliance with a number of different memory consistency models in different embodiments. As described below in further detail, if the memory consistency model is the TSO model, the rules used by analysis module may be derived from a problem termed verifying total store order conflict, or "VTSO-conflict", if write ordering information is available, and may be derived from a problem termed "VTSO-read" if write ordering information is not available. As noted above, in some embodiments analysis module 120 may use graphical techniques to verify memory consistency model compliance, e.g., by attempting to detect cycles in a directed graph representing the ordering of memory operations.

The multithreaded test program used by test module 110 may be generated in accordance with a set of user-specified preferences in some embodiments. Test generator 112 may provide an interface (e.g., input parameter files or a graphical user interface) allowing a user to specify parameters such as relative frequency of instruction types, memory layout details and loop characteristics. Based on such parameters, the test program may include a pseudo-random or random sequence of instructions likely to result in data races, for example including frequent memory accesses to shared memory locations from different processing elements 140. In one embodiment test generator 112 may first generate an internal representation of the multithreaded test program, each thread represented by a sequence of nodes corresponding to operations performed in that thread. The internal representation may then be mapped by test generator 112 into a set of assembler instructions or to a set of instructions in some other language suitable for the test platform 130 (e.g., simulation control instructions).

In one embodiment, test generator 112 may be configured to implement "unique store values" (USV)—i.e., to ensure that every write or store operation in the test program writes a distinctly identifiable value. Such unique store values may allow the analysis module 120 to map each load operation back to the store operation that generated the loaded data. To ensure that store values are unique, test generator 112 may, for example, maintain one or more running counters (e.g., an integer counter and a floating point counter for integer and floating point operations respectively) whose values may used for the store values and incremented after each use. In some embodiments, where for example test platform 130 does not automatically save the results of reads or load operations, the test program generated by test generator 112 may also include code to observe and save the results of load operations. The load results may be buffered (e.g., in processor registers) and flushed to memory when the buffers become full, thus reducing perturbation during testing.

In addition to loads and stores with standard operand sizes (e.g., 32, 64 or 128 bits, depending on the processor architecture), in some embodiments test generator 112 may include a variety of other operations in the test program. For example, in one embodiment, memory barrier instructions which may require all previous instructions on the issuing processor or processing element 140 be globally visible before the next instruction is issued may be included. In addition, in other embodiments, instructions to access address space identifiers, various types of prefetch operations, block loads or stores (which may, for example, read or write 64 bytes at a time), cache flush or pipeline flush instructions, compare and swap (CAS) instructions, non-faulting loads, unpredictable conditional branches, inter-processor interrupts or sequences of operations that may cause cache line replacements and/or writebacks may be included. As noted earlier, in some embodiments, users may specify the desired mix of different types of instructions to be included in the test program, e.g., by specifying the total number of operations and the percentage of each type of operation. In one embodiment, users may also specify desired sequences of particular instructions for inclusion in the test program, for example to exercise known or expected "corner cases" in the design, or lead to situations that are more likely to stress the memory subsystem's ability to conform to the memory consistency model.

In one embodiment, execution coordinator 114 may be configured to initialize the test platform 130 (i.e., detect the number of processing elements 140 and/or bring the test platform to a desired initial state), to initiate the execution of the multithreaded test program, and to gather the results of the execution. The results may include, for example, values read and written for different load/store operations executed by the processing elements 140, and the per-processing element program order (i.e., the sequence of operations at each processing element). For certain test platforms, execution coordinator 114 may also be configured to disable or enable optional features supported by the test platform, e.g., in order to improve test execution performance.

In an embodiment employing a simulation model as the test platform, for example, execution coordinator 114 may disable optional runtime detection of failures in order to increase simulation throughput. In some embodiments, execution coordinator 114 may be operable to store the results of the execution of the multithreaded test program in a variety of different formats, including a format suitable for consumption of the results by analysis module 120 (e.g., in a persistent file or via a pointer to a shared area of volatile memory) and a human-readable format. Input parameters may be used to specify a desired output format for the results in some embodiments. Execution coordinator 114 may also be configured to save a representation of the results in a results database in some implementation, so that, for example, differences in results for different test runs may be obtained easily during post-processing.

Analysis module 120 may be operable to verify whether results of the test program execution, obtained for example from execution coordinator 114, correspond to a valid ordering of events according to the memory consistency model. It is noted that while in the following description, the TSO memory consistency model is used as an example, analysis module 120 may be capable of verifying more than one memory consistency model in some embodiments. In such embodiments where multiple memory consistency models may be verified, an identification of the specific memory consistency model to be verified (and/or an identification of the rules corresponding to the specific memory consistency model to be verified) may be provided to analysis module 120, e.g., via an input parameter.

In one embodiment, analysis module 120 may be operable to represent memory operations performed during the execution of the test program as the nodes of a directed graph, and to add edges to the directed graph representing ordering relationships between the memory operations. In such an embodiment, analysis module 120 may be configured to detect that the results of the execution violate the memory consistency model if a cycle is found in the directed graph—that is, the presence of a cycle may indicate a violation of the memory consistency model.

As described below in further detail, in some embodiments, analysis module 120 may add edges to the directed graph 120 in a number of steps, some of which may include iterative traversals of the directed graph. Analysis module 120 may use different sets of rules to generate the edges, depending on the specific memory consistency model being verified and on the type of additional information (e.g., total ordering of writes and/or mappings from each load to a store that generated the value read by the load) provided by the test platform 130. It is noted that while a detection of a cycle in the graph may indicate a violation of the memory consistency model, in some embodiments and for certain kinds of test platforms (e.g., platforms that do not provide total write ordering information), the fact that the analysis does not detect a cycle in the graph may not imply that the results of the execution necessarily comply with the memory consistency model. That is, as explained in further detail below with the help of the example of FIG. 5*a*, the basic technique of adding edges and detecting cycles described above may not be complete in such embodiments, in that certain types of ordering relationships and/or violations may sometimes be missed. Analysis module 120 may utilize one or more heuristics to improve the confidence level in the result of the analysis, and/or the efficiency of the analysis, in such embodiments.

In order for a test execution result to comply with a memory consistency model, the sequence of memory operations as represented by the results must satisfy the axioms of the memory consistency model. The rules used by analysis module 120 to perform the graphical analysis as described above may therefore be derived, at least in part, from the axioms of the memory consistency model being verified in some embodiments. As noted above, the functionality of analysis module 120 is described herein using TSO as an exemplary memory consistency model according to one embodiment, although analysis module 120 may also be operable to verify compliance with a variety of other memory consistency models (e.g., Sequential Consistency (SC) or Relaxed Memory Order (RMO)) in other embodiments.

As described earlier, the TSO memory consistency model includes six axioms: the Order, Atomicity, Termination, LoadOp, StoreStore and Value axioms. The Order axiom requires that there is a total order over all stores. The Atomicity axiom requires that there be no intervening stores between a load component and a store component of an atomic memory operation such as a swap. The Termination axiom requires that all stores and swaps eventually terminate. That is, if one processor of a multiprocessor does a store to a particular memory location and another processor repeatedly does loads to read the particular memory location, there will eventually be a load that reads the value stored by the first processor. The LoadOp axiom requires that if an operation follows a load in per processor program order, then the operation must also follow the load in global memory order. The StoreStore axiom requires that if two stores appear in a particular order in per processor program order, then they must also appear in the same order in global memory order. Informally, the LoadOp and StoreStore axioms together imply that under TSO, the only kind of reordering allowed between operations on the same processor is for loads to overtake stores, i.e., a load which succeeds a store in program order may precede it in global order. The Value axiom requires that the value returned by a load from a particular memory location is the value written to that memory location by the last store in global memory order, among the set of stores preceding the load in either global memory order or program order. The Value axiom allows a load to read the value written by an earlier store on the same processor, before that store has completed in global order. This permits processor implementations with store buffers, for example, to locally bypass data from a store to a load, before the store is globally visible. In addition, for multiprocessor systems that implement memory barrier operations, a MemBar axiom may be included in TSO, which requires that if, in program order, a load or store "A" precedes a load or store "B" and if a memory barrier operation occurs between "A" and "B", then "A" must precede "B" in global memory order.

In general, the problem of verifying compliance with TSO (which may be termed the VTSO or "Verifying TSO" problem) may be stated as follows. If the memory operation sequences for each thread of a multithreaded program (such as a test program generated by test generator 112) are known, along with the memory location and the written value for each operation with store semantics, and the memory location and the read value for each operation with load semantics, are all the TSO axioms satisfied? (It is noted that since the Termination axiom does not specify a bound on how long it takes for a written value to be seen by other processors, and thus cannot be completely checked using finite test cases, the Termination axiom may be omitted from consideration in the design of practical testing methods for VTSO. Further discussion of the Termination axiom is therefore omitted from the following description.)

In one embodiment, analysis module 120 may be operable to use at least one of two sets of rules, derived respectively from two sub-problems of VTSO known as "VTSO-read" and "VTSO-conflict", in performing the graphical analysis described above. The VTSO-read problem is the VTSO problem with additional information mapping each read operation to the corresponding write operation that generated the read value. A VTSO problem where all written values are unique (e.g., as a result of the Unique Store Values technique used by test generator 112 in generating the multi-threaded test program described above) becomes, in effect, a VTSO-read problem. The VTSO-conflict problem is the VTSO-read problem with additional information specifying the total order of write operations to each memory location. The VTSO-read and VTSO-conflict problems may each be considered to represent scenarios or test execution results where the test platform provides specific details about memory operations that may be used to simplify the verification of compliance with TSO axioms. Since VTSO-conflict provides an additional level of detail (total write ordering) beyond the level of detail provided in VTSO-read, VTSO-conflict in turn represents a problem that in general may have a lower computational complexity than VTSO-read.

In embodiments where the Unique Store Values technique is used in generating the multithreaded test program, each test run may represent an instance of the VTSO-read problem. In embodiments where total write ordering information for each memory location is additionally available, a test run may also represent an instance of the VTSO-conflict problem. In adding edges to the directed graph representation of the memory operations, analysis module 120 may be configured to use a first set of rules if the test run represents an instance of the VTSO-conflict problem, and a second set of rules for if the test run represents an instance of the VTSO-read problem, but does not also represent the VTSO-conflict problem. The edges added by analysis module 120 may represent global ordering information derived from the operation sequences for each processing element and the additional information (e.g., mapping from loads to corresponding stores and/or total write ordering) provided in the test results.

In one embodiment, the rules for adding edges for VTSO-conflict may include rules for adding static edges, observed edges and value ordering edges. Static edges may be generated independent of the values that may be read or written in load and store operations. Observed edges may be generated based on load results, and value ordering edges may be added based on total write ordering. In such an embodiment, the rules may be summarized as described below. In the summarization of the rules, "L" represents a load, "S" represents a store, "Op" represents either a load or store, "M" represents a memory barrier operation, ".pro." represents per processing element program order, and ".glo." represents global memory order. Each implication of an ordering relationship derived from the rules may result in the addition of a corresponding edge to the graph. Other memory operations may be mapped to loads and stores in a preliminary step before the rules are applied—for example, a swap operation may be represented as a load and a store. In addition, a single synthetic node, logically equivalent to a set of stores, may be added at the root of the graph to initialize memory locations accessed during the test.

Static Edges:

Rule A1: L.pro.Op implies L.glo.Op (derived from the LoadOp Axiom)

Rule A2: S.pro.S' implies S.glo.S' (derived from the Store-Store Axiom)

Rule A3: S.pro.M.pro.L implies S.glo.L (derived from the Membar Axiom)

For the remaining rules, S, S' and L represent accesses to the same memory location, where S writes the value read by L, and S' writes a different value.

Observed Edges:

Rule A4: If S does not precede L in per processing element program order, this implies S.glo.L (derived from Value axiom, which requires that the load must read the value last written in global memory order, so if S does not precede L on the local processor, it must precede L in global memory order)

Rule A5: S'.pro.L implies S'.glo.S (also derived from the Value axiom. If S' precedes L on the local processor, but L reads the value written by S, then S' must precede S in global memory order.)

Value Ordering Edges:

Rule A6: S.glo.S' (according to the total write order for the memory location written by S and S')

Rule A7: S.glo.S' implies L.glo.S' for all L reading the value written by S (derived from the Value axiom. This rule enforces the Value axiom by ensuring that S must be the most recent store in global order for L because every store ordered after S will also be ordered after L. Only the S' that immediately follows S in the total write ordering for that location need be considered in applying this rule)

The rules used for VTSO-read may also include the rules for adding static edges and observed edges, as described in Rules A1-A5 above, in one embodiment. However, as total write ordering information may not be available in VTSO-read, rules A6 and A7 may be replaced by rules B6 and B7 for adding inferred edges in some embodiments.

Inferred Edges:

Rule B6: S'.glo.L implies S'.glo.S (derived from the Value axiom. Assuming the opposite implication, S.glo.S', leads to a contradiction because L cannot read the value written by S, since that value would have been overwritten by S')

Rule B7: S.glo.S' implies L.glo.S' (also derived from the Value axiom. This rule is similar to rule A7, except that, since total write ordering information is not available in VTSO-read, the S' that immediately follows S in the per-location total order may not be known, and so rule B7 must be applied for every applicable S'.)

The inferred edges corresponding to rules B6 and B7 may be added in multiple iterations in some embodiments, as indicated in the following high-level description and pseudo-code. The function w(L) in the pseudo-code identifies the store operation that wrote the value read by the load L.

Baseline Algorithm

```
// Input: A per-processing element memory operation sequence and a
// function w that maps a load to the store which created its value
// First, add static and observed edges (Rules A1-A5)
// Then, add inferred edges iteratively (Rules B6-B7)
do
```

-continued

```
for each load L
    S = w(L); // find the store that wrote the value read by L
    recursively trace all store predecessors S' of L:
    if (S' != S) and (S and S' write to the same address)
        then add edge from S' to S;
    end if;
end for;
for each store S
    recursively trace all store successors S' of S:
    if (S' and S write to the same address)
        then add edge from L to S' for all loads L reading value
            written by S;
        end if;
end for;
until no more edges can be added
```

The first for loop in the pseudo-code corresponds to an application of rule B6, while the second corresponds to an application of rule B7. To apply rule B6, the directed graph may be traversed backwards from L to find all its currently-known store predecessors in global order. To apply rule B7, the directed graph may be traversed forwards from S to find currently-known successors of S in global order. Since the global order may still be in the process of being derived when the traversals occur, rules B6 and B7 may be applied iteratively to the directed graph until a fixed point is reached and no additional edges are added in a complete iteration. It is noted that the complexity of the graphical analysis algorithm for VTSO-read may be shown to be polynomial in terms of the number of nodes in the directed graph, while the algorithm described earlier for VTSO-conflict may be shown to be linear in terms of the number of nodes. An example of the application of the rules for VTSO-read is provided below, in conjunction with the description of FIG. 4.

Figure 3:
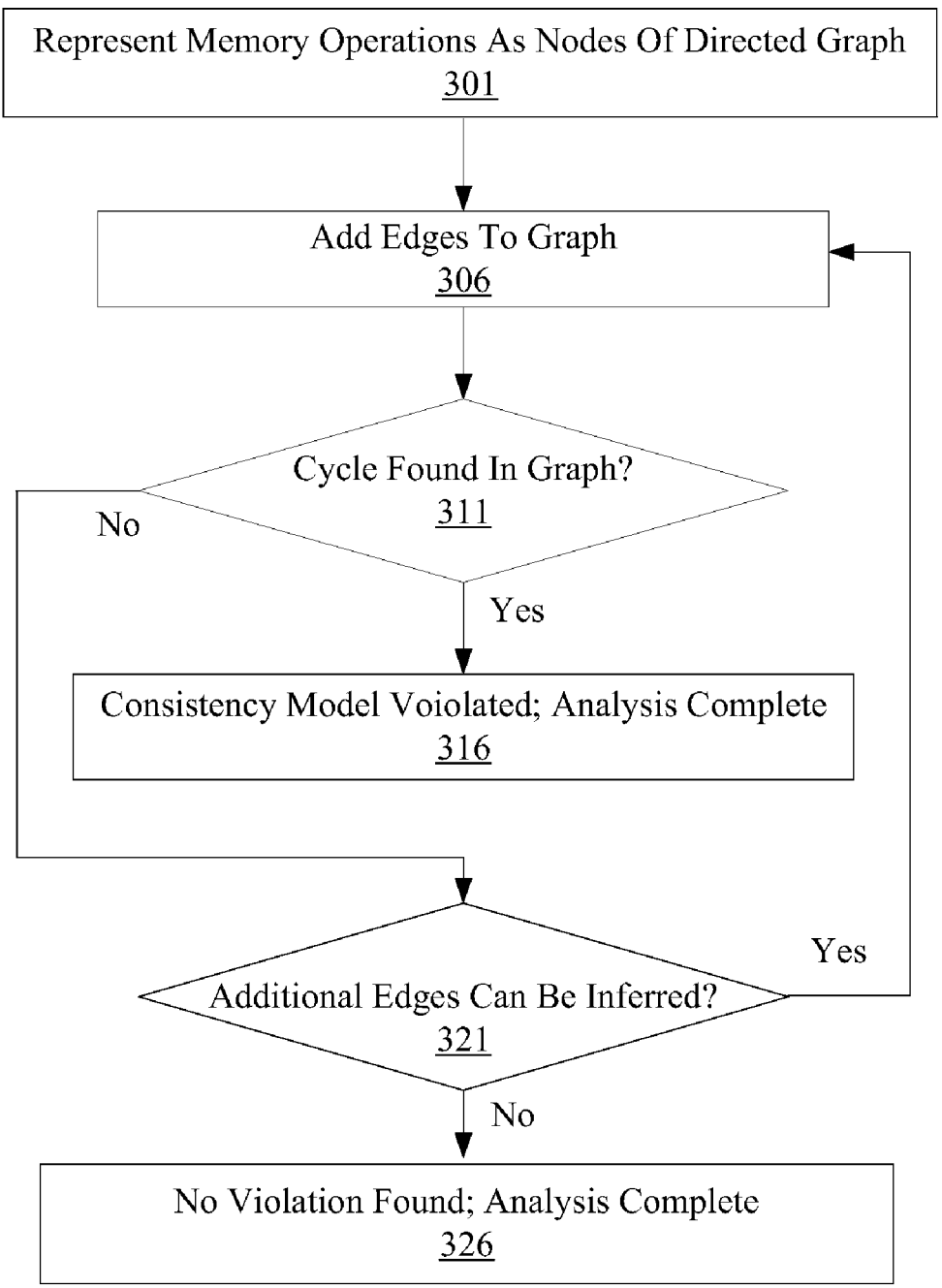
FIG. 3 is a flow diagram illustrating further aspects of the operation of analysis module, according to one embodiment.

FIG. 3 is a flow diagram illustrating further aspects of the operation of analysis module 120 according to one embodiment. As described above, analysis module 120 may be configured to represent memory operations performed during the test execution as nodes of a directed graph (block 301), and add edges representing ordering relationships between the memory operations to the graph (block 306). For example, in one embodiment, edges corresponding to the application of rules A1-A5 and to a first iteration of an application of rules B6-B7 may be added in operations corresponding to block 306 during an initial pass through block 306. If a cycle is detected in the graph at this point (decision block 311), analysis module 120 may indicate that the test results violate the memory consistency model (block 316) and terminate the analysis. If no cycle is detected, and additional edges for the graph can be inferred (as detected in decision block 321), such additional edges may be added in a repeat pass through block 306. In one embodiment, iterations through blocks 306, 311 and 321 of FIG. 3 may correspond to the pseudo-code provided above that represents iterations of application of rules B6 and B7. Finally, if in block 321 no additional edges can be inferred, the analysis may be completed with no violation being found (block 326).

Figure 4:
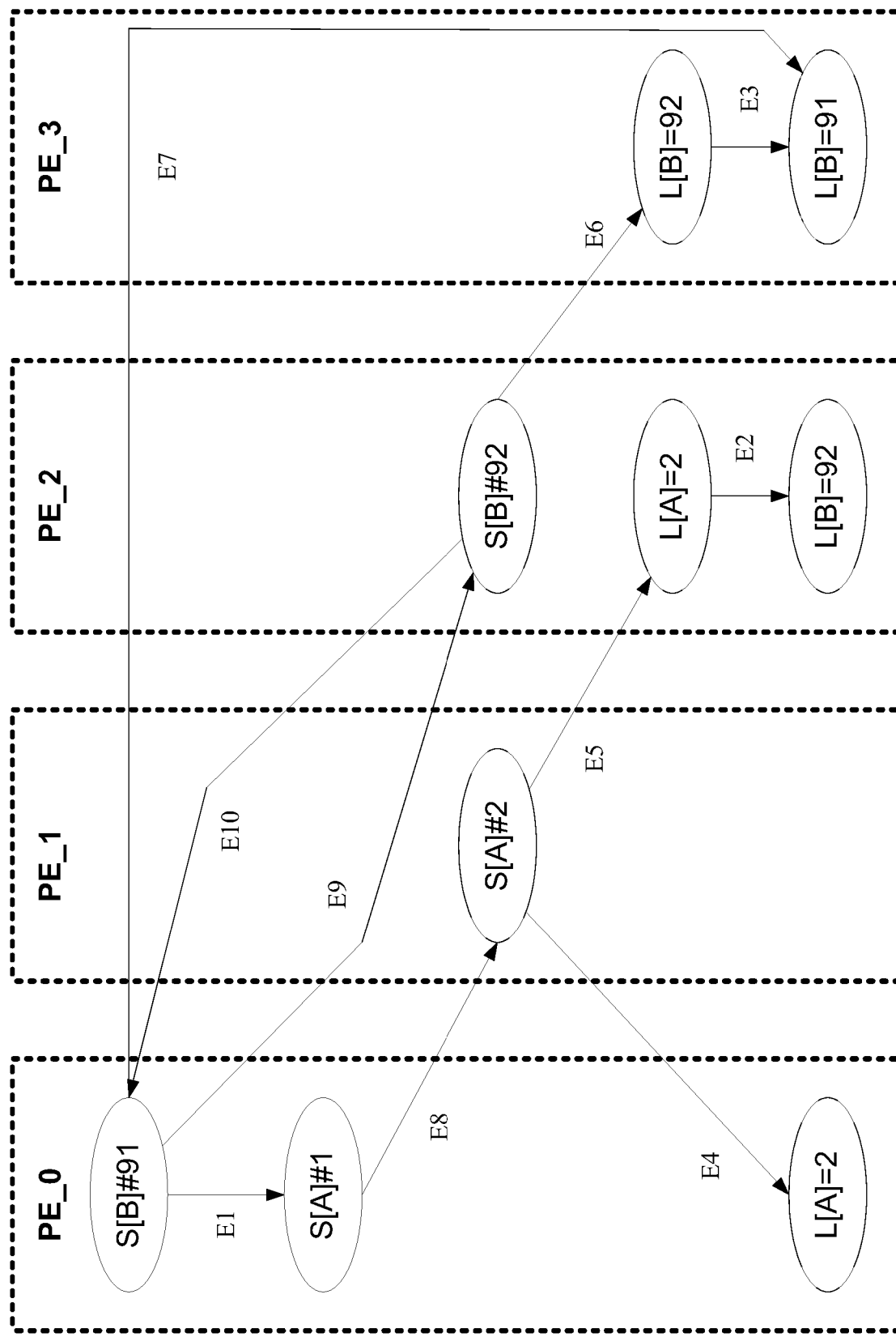
FIG. 4 illustrates an example of a directed graph representation of memory operations generated by an analysis module, according to one embodiment.

FIG. 4 illustrates an example of a directed graph representation of memory operations generated by analysis module 120 for an execution of a multi-threaded test program representing a VTSO-read problem, according to one embodiment. In FIG. 4, the notation "S[A]#M" refers to a store which writes the value M to memory location A, and the notation "L[B]=N" refers to a load that reads the value N from memory location B. The per-processing element program order is shown in four columns in FIG. 4, each column corresponding to one of four processing elements $PE_{13}$ 0, PE_1, PE_2, and PE_3. The events in each column are sequenced from the top of the column to the bottom of the column in program order. For example, the program order for processing element PE_1 is "S[B]#91", followed by "S[A]#1", followed by "L[A]=2".

In generating the graph illustrated in FIG. 4, analysis module 120 may first add edges E1, E2 and E3, corresponding to rules A1 and A2 described above, in accordance with the LoadOp and StoreStore axioms. Next, observed edges E4, E5, E6 and E7 may be added by applying rule A4. The application of rule A5 to "L[A]=2" on PE_0 may then result in the addition of observed edge E8. During the application of rule B6 for the load "L[B]=92" on PE_2, "S[B]#91" on PE_0 may be detected as a predecessor, leading to the addition of inferred edge E9. Finally, tracing the predecessors of "L[B]=91" on PE_3 according to rule B6, analysis module 120 may detect "S[B]#92", leading to the addition of inferred edge E10. At this point, analysis module 120 may detect the cycle formed by edges E9 and E10, indicating a TSO violation: i.e., a conflicting order between "S[B]#91" and "S[B]#92". As described in conjunction with the description of FIG. 3 above, analysis module 120 may then indicate that TSO has been violated and terminate analysis.

Figure 5A:
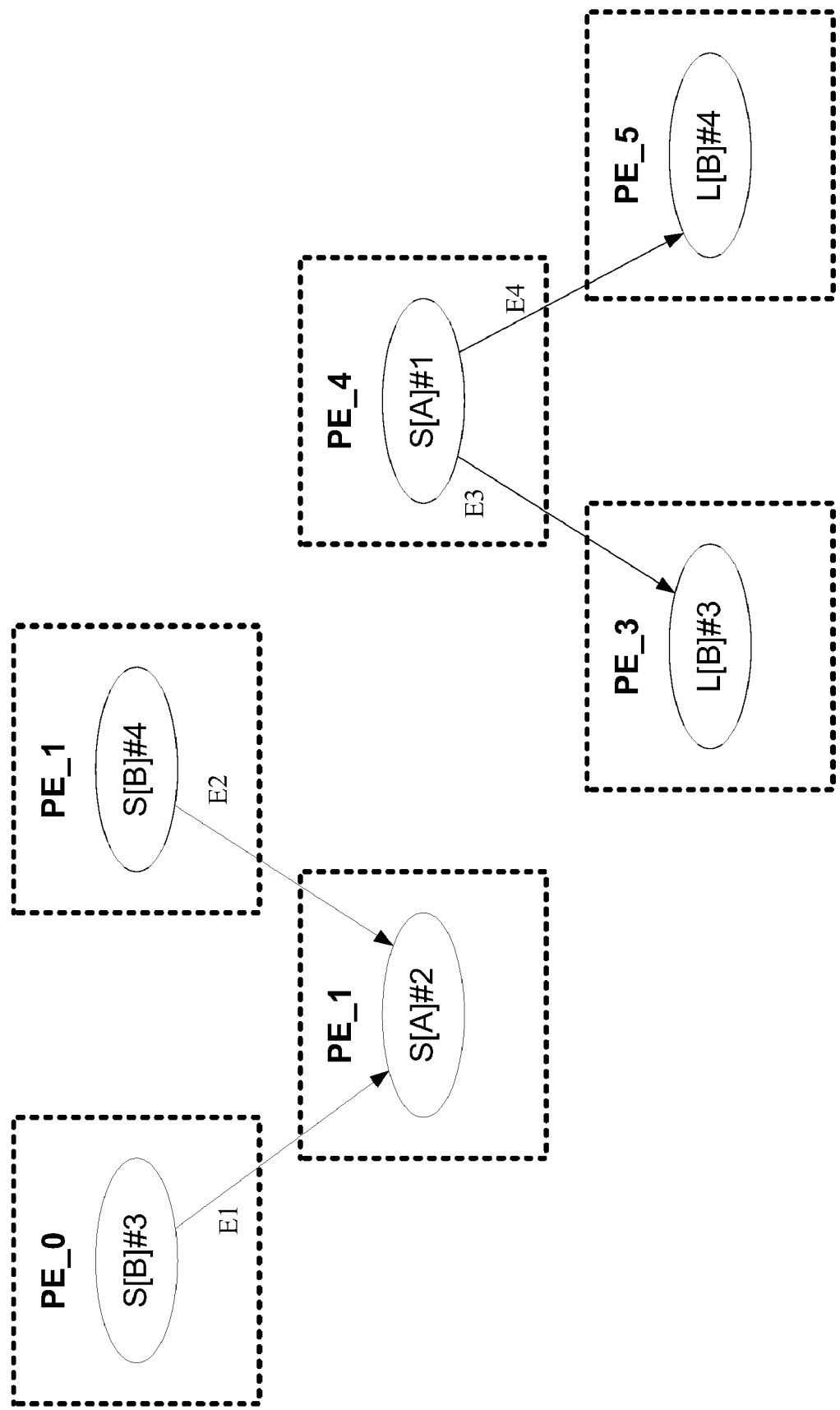
FIG. 5a illustrates another example of a directed graph representation of memory operations generated by an analysis module, according to one embodiment.

It is noted that, in embodiments where the test results represent a VTSO-read problem (and not a VTSO-conflict problem because total write ordering information is not available), while the analysis performed by analysis module 120 may detect violations of the TSO axioms if cycles are found, the basic graphical technique as described above may be incomplete. That is, in the absence of cycles, while a global order that is consistent with the LoadOp, StoreStore, Membar, Value and Atomicity axioms may be obtained from the graph at the end of the analysis, the analysis does not ensure that Order axiom is satisfied. FIG. 5a illustrates an example of a directed graph representation of memory operations generated by analysis module 120 for an execution of another multi-threaded test program representing a VTSO-read problem, according to one embodiment. Memory operations for six processing elements, PE_0 through PE_5, are shown in FIG. 5a, using the same notation as used in FIG. 4. In the example shown in FIG. 5a, analysis module 120 has reached a fixed point at which no new edges can be inferred (i.e., no further iterations of application of rules B6 and B7 are performed). The analysis module 120 has not detected any cycles, and "S[A}#1" and "S[A]#2" have been left unordered. However, "S[A]#1" must precede "S[A]#2" in the illustrated memory operations. Otherwise, "S[A]#2" must precede "S[A]#1" by the Order axiom, but given this order, only one of the two values "3" or "4" may be read by the two loads to location B that are ordered after "S[A]#2". While the example illustrated in FIG. 5a does not represent a TSO violation missed by analysis module 120, adding a similar, mirrored set of nodes to a different location C (e.g., two stores to C ordered before "S[A]#1" and two loads to C ordered after "S[A]#2") may create an instance of a TSO violation that may be missed by the algorithm for VTSO-read as described above.

In order to satisfy the Order axiom, the analysis module would have to identify unordered writes at the end of the algorithm and search for a combination of relations between the unordered writes that is compatible with the results. Such a search may make the analysis runtime exponential with respect to the number of nodes in the graph in the worst case, which may make the analysis impractical. By not explicitly enforcing the Order axiom, the analysis module 120 may thus trade off accuracy for reasonable analysis time. As described below, in some embodiments a heuristic based on possible write orders may be employed by analysis module 120 to increase the probability of determining compliance with the Order axiom, and to potentially reduce the number of iterations of applications of rules B6 and B7.

In one embodiment, in order to completely verify TSO compliance, an attempt is made to determine if there exists a Total Operation Order (TOO), which completely orders all operations (loads and stores) in the program, that also satisfies the rest of the TSO axioms. This TOO corresponds to a stronger version of the Order axiom (which is equivalent to the requirement that only stores be ordered). To increase the probability of finding a total valid order and thereby removing the source of incompleteness, in one embodiment analysis module 120 may be configured to adopt the following heuristic. After each complete iteration of applying rules B6 and B7 to all the nodes in the directed graph, analysis module 120 may perform a topological sort on the graph nodes and extract the resulting write order per location. Since the topological sort provides a possible total write order, the algorithm for VTSO-conflict (i.e., the application of rules A1-A7) may then be applied. If no cycles are found after the VTSO-conflict analysis based on the possible total write order, a total operation order (TOO) valid under TSO may be derived from the graph (e.g., by another topological sort). The analysis module 120 may therefore indicate that the program execution results are valid under the TSO axioms and terminate analysis. In addition to potentially providing such a positive determination of compliance with respect to TSO for some execution results, the application of such a heuristic may thus also reduce the number of iterations for rules B6 and B7 that may otherwise be applied. In contrast to the possible positive determination of compliance with TSO that may be provided using the heuristic, the more basic analysis described above (i.e., the application of rules A1-A5 and B6-B7 without the heuristic) may only indicate whether a violation of TSO was found or not (e.g., as in block 326 of FIG. 3), and may miss some violations of TSO for some executions. If the heuristic does not succeed in providing a valid total operating order (e.g., if a cycle is detected using the VTSO-conflict rules), however, analysis module 120 may not be able to detect that a TSO violation has occurred (since the heuristic was based on a hypothetical write order speculated by the topological sort, rather than on a known, actual write order). If no valid total operating order is found, therefore, in one embodiment analysis module may continue further iterations of applying rules B6 and B7, which may in turn result in further applications of the heuristic.

Figure 5B:
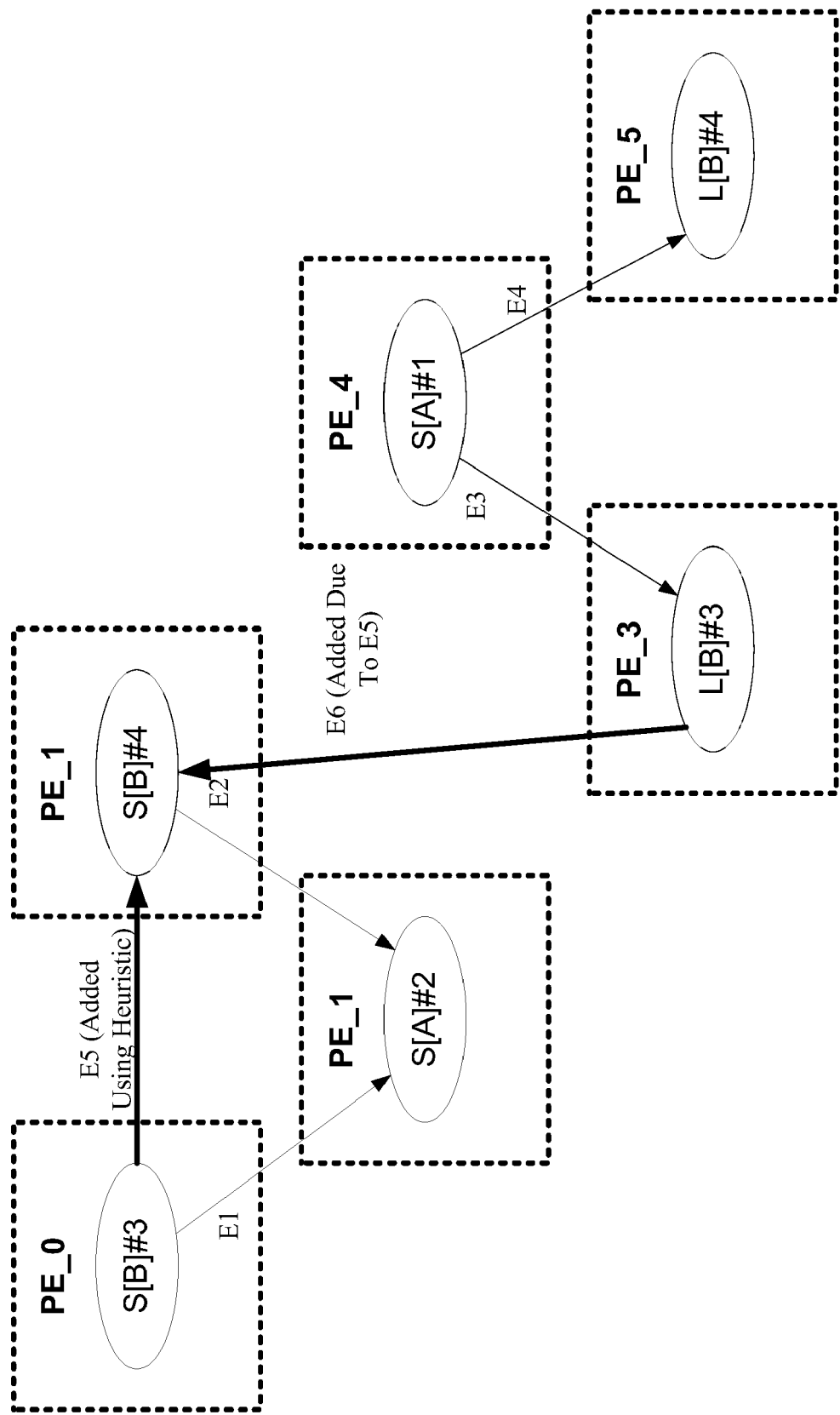
FIG. 5b illustrates an example of an application of a heuristic by an analysis module to the directed graph representation shown in FIG. 5a, according to one embodiment.

FIG. 5b illustrates an example of an application of the heuristic described above to the directed graph representation shown in FIG. 5a, according to one embodiment. In the illustrated example, the topological sort performed by analysis module 120 has resulted in ordering "S[B]#3" before "S[B]#4", as indicated by edge E5. That is, edge E5 has been added to the graph by analysis module 120 to represent a possible write order in which "S[B]#3" precedes "S[B]#4". After analysis module 120 has added edge E5, the application of rule A7 may result in the further addition of edge E6. At this point, the order between "S[A]#1" and "S[A]#2" is also established, no cycle has been detected, and analysis module 120 may determine a valid total ordering that complies with the TSO axioms and terminate analysis. For example, as shown in FIG. 5b, a valid total operation ordering such as ("S[B]#3", "S[A]#1", "L[B]#3", "S[B]#4", "S[A]#2", "L[B]#4") may be determined by analysis module 120, e.g., using a topological sort.

Figure 6A:
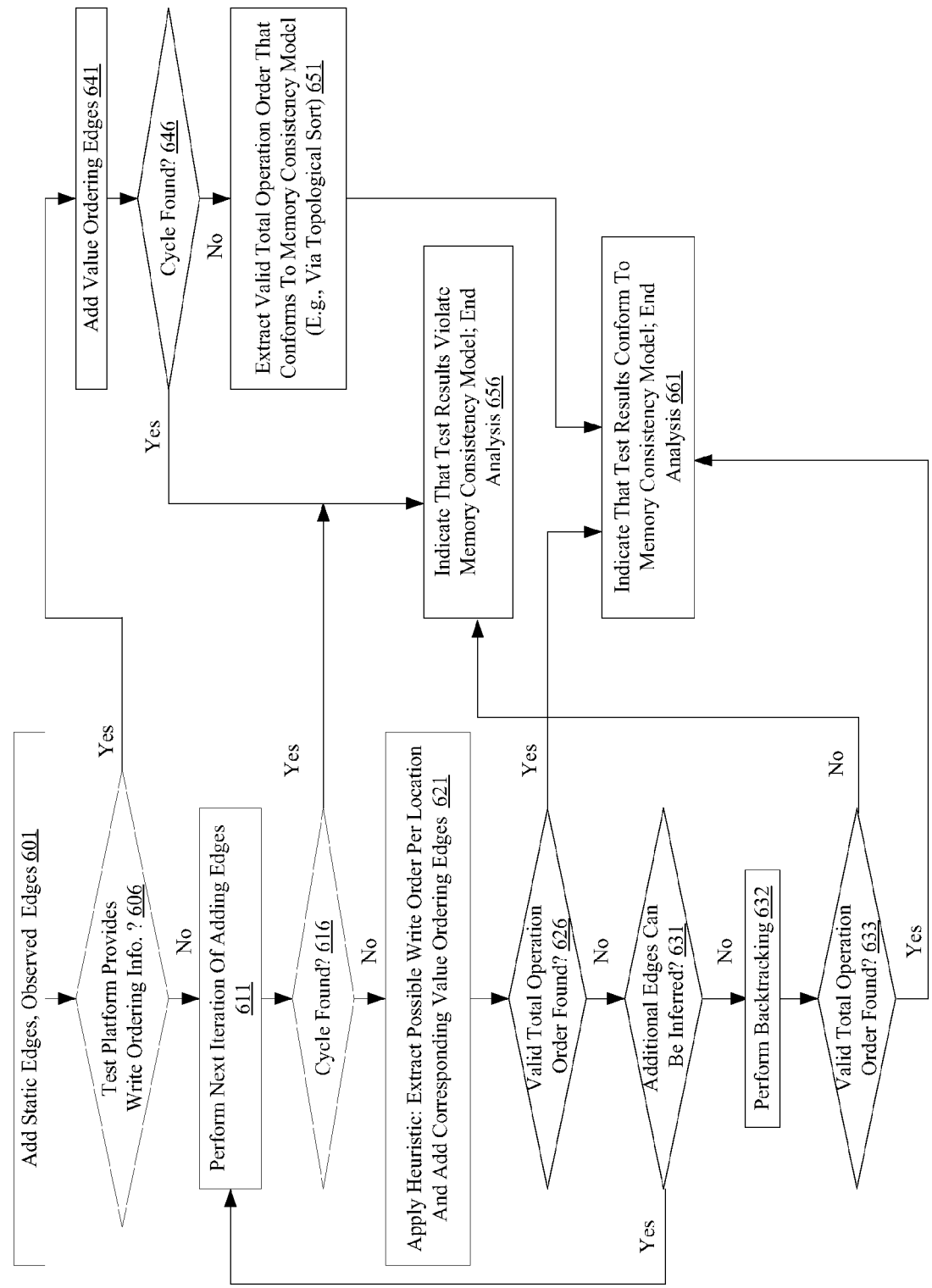
FIG. 6a is a flow diagram illustrating further aspects of the operation of an analysis module according to one embodiment, where the analysis module may be configured to apply a heuristic based on a possible write order.

FIG. 6a is a flow diagram illustrating further aspects of the operation of analysis module 120 according to one embodiment, where analysis module 120 may be configured to apply the heuristic based on a possible write order as described above. As described earlier, after representing the memory operations performed during the test program execution as the nodes of a directed graph, analysis module 120 may add static edges and observed edges to the graph (block 601 of FIG. 6a). The static and observed edges may be added by applying rules A1-A5. If the test platform 130 provides write ordering information, as detected in decision block 606 of FIG. 6a, analysis module 120 may perform VTSO-conflict analysis, e.g., by adding value ordering edges in accordance with rules A6 and A7 (block 641). If a cycle is found in the graph after the VTSO-conflict rules have been applied (as detected in block 646), analysis module 120 may indicate that the test results violate TSO and end analysis (block 656). If no cycle is found under the VTSO-conflict rules, analysis module 120 may extract a valid total operation order that conforms to TSO, e.g., via a topological sort of the graph (block 651). Analysis module 120 may then indicate that the execution results are valid under TSO (block 661) and terminate analysis.

If test platform 130 does not provide write ordering information, analysis module 120 may proceed to iteratively apply rules B6 and B7 for the VTSO-read problem. In the embodiment depicted in FIG. 6, after every full iteration of adding inferred edges according to rules B6 and B7 (block 611), analysis module 120 may check the graph for cycles (decision block 616). If a cycle is found, analysis module 120 may indicate that the test results violate TSO and terminate analysis (block 656). However, if no cycle is found, analysis module 120 may apply the heuristic described above (block 621). That is, analysis module 120 may extract a possible write order from the graph, e.g., via a topological sort, and add value ordering edges according to the VTSO-conflict rules A6 and A7. If, after adding the value ordering edges based on a possible write order, a valid total operating order is found (as detected in decision block 626), analysis module 120 may indicate that the results conform to TSO and terminate analysis (block 661). If a valid total operating order is not found, analysis module 120 may revert to the graph as it existed prior to the application of the heuristic and continue with VTSO-read analysis. For example, if additional edges can be inferred using rules B6 and B7 (as detected in decision block 631), analysis module 120 may iterate over the operations starting at block 611.

In one embodiment, if no additional edges can be inferred (decision block 631), a search with backtracking procedure (block 632) may be utilized wherein an arbitrary "tie-break" decision is made by adding an edge between operations left unordered and reapply the baseline algorithm which may add additional edges. This procedure is repeated until no operations are longer left unordered, that is, a valid TOO has been achieved (block 633) and we can conclude that the results conform to TSO and terminate analysis (block 661). During this process, if a cycle is found or the topological sort gets stuck (no instruction can be picked without violating any TSO axioms), instead of giving up, a backtrack is made to the last arbitrary tie-break decision made and a different operation is chosen to order first. Given that a valid TSO will also result in a valid TOO, we can unwind the order directly to the most recent store. We maintain data structures such that we can checkpoint and undo these updates when we need to backtrack and cancel the decision. Edges that are derived after a store is picked by the topological sort will be associated with the store. When we backtrack and undo the picking of a store, we remove all the derived edges associated with it and recompute vector clocks (defined and explained in the following paragraphs) for all the affected nodes. If we backtrack to the first tie-break decision and find that we have already exhausted all the possible decisions, we conclude that a valid TOO does not exist (not that it may exist but we could not find it) and the results do not conform to TSO (specifically, the Order axiom is violated) (block 656). As noted above, similar techniques and heuristics may be applied to verify compliance with memory consistency models other than TSO in some embodiments.

Figure 6B:
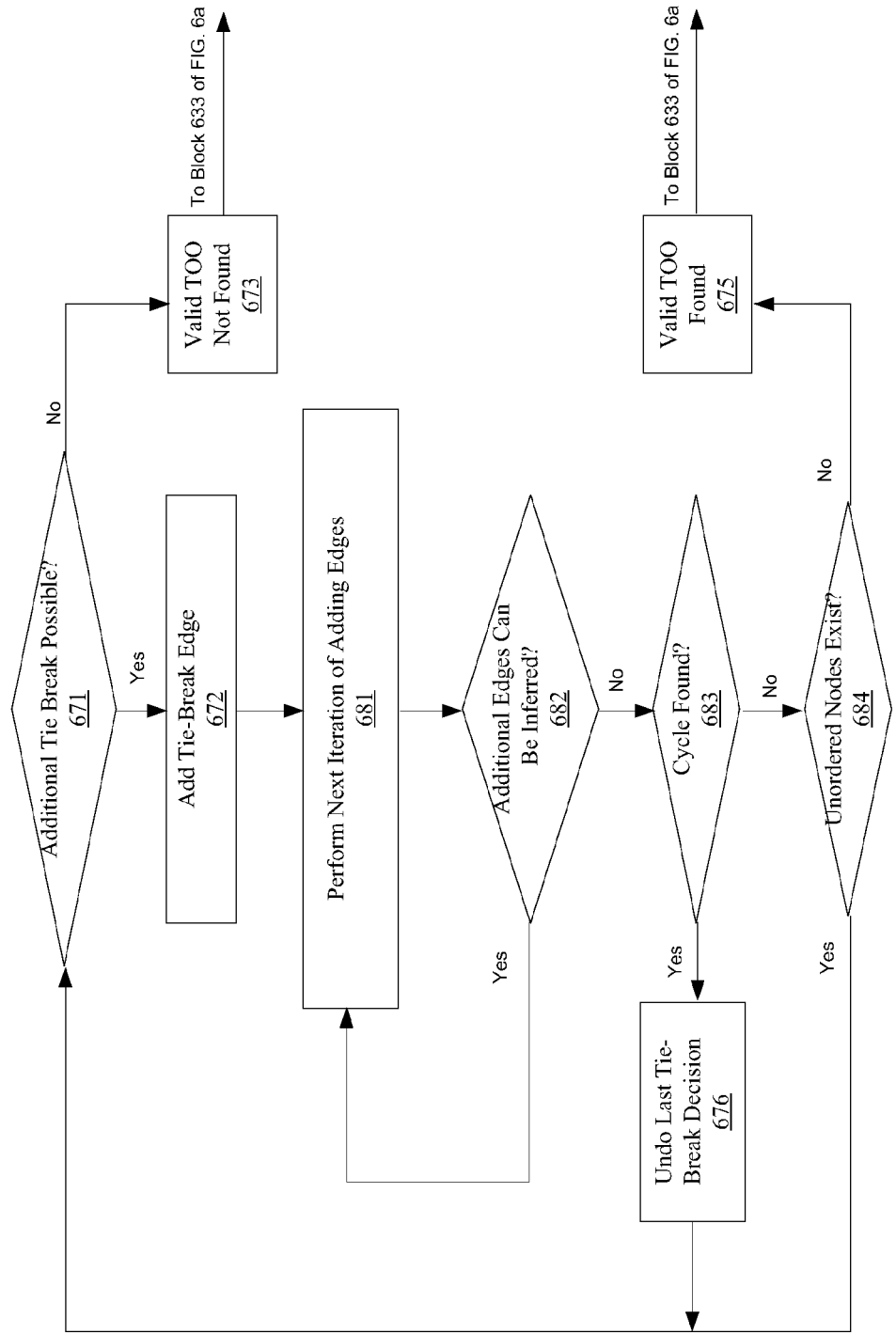
FIG. 6b illustrates one embodiment of a method for performing a backtracking procedure.

FIG. 6b illustrates one embodiment of the backtracking procedure shown as block 632 of FIG. 6a. As shown, if a tie-break decision is possible (block 671), an edge is selected and added (block 672). Otherwise, a valid TOO is not found (block 673) and the method proceeds to block 633 of FIG. 6a. Having added a tie-break edge, an iteration of performing additional edges is performed (block 681). If additional edges can be inferred (block 682), the method proceeds to block 681. If no additional edges can be inferred (block 682), the a determination is made as to whether a cycle is found (block 683). If a cycle is found, the last tie-break decision (and possibly additional recent decisions) is undone (block 676) and the method returns to block 671. On the other hand, if no cycle is found (block 683), then a determination is made as to whether any unordered nodes exist (block 684). If unordered nodes exist, the method proceeds to block 671. However, if no unordered nodes exist, then a valid TOO is found (block 675) and the method proceeds to block 633 of FIG. 6a.

As described earlier, the addition of inferred edges in accordance with rules B6 and B7 may require several iterations of backward and forward traversals of the directed graph from multiple starting points (i.e., multiple load and store nodes) in some embodiments. During each iteration, new predecessor nodes for each load and new successors for each store may need to be found using the current set of edges in the graph. In one embodiment, analysis module 120 may be configured to use a technique based on vector clocks to reduce or limit the total number of graph edges traversed when applying rules B6 and B7. Pseudo-code including further details of how the number of traversed edges is limited, as well as an example of using the vector clock technique, is provided below. In analyzing the results of a multithreaded test execution, an array or vector of elements, which may be termed a vector clock, may be maintained by analysis module 120 for each node of the graph. Each element of the vector clock for a particular node M representing a memory operation at a processing element PE_k may identify a particular node R at one of the other processing elements, such that R occurs after node M in global order. In particular, in one embodiment, the first node at the other processing element (i.e., the earliest node in program order for the other processing element) that occurs after node M in global order (as known in the current analysis step) may be identified as node R. The vector clock at one or more nodes may be modified as the analysis progresses, inferred edges are added, and analysis module 120 modifies its knowledge of global order.

The vector clock based scheme used by analysis module 120 may rely on a property of the Sequential Consistency (SC) memory consistency model in some embodiments. In SC, program order implies global memory order. Thus, if a memory operation M1 at processing element PE_p precedes a memory operation M2 at processing element PE_q, all memory operations from PE_q after M2 in program order are also ordered after M1 in global memory order. Therefore, in adding inferred edges for a node representing M1 while verifying compliance with SC, analysis module 120 may only need to keep track of the earliest memory operation M2 in program order at each other processing element such that M1 precedes M2 in global memory order. For example, in applying rule B7, instead of traversing the whole graph to find all S' which succeed S in memory order, only the earliest such S' for each processing element may need to be considered. A vector clock for a given store node may identify such earliest S' nodes for each other node.

In applying a vector clock technique to TSO, however, differences between SC and TSO may need to be taken into account. In TSO, program order does not imply global memory order, as a load may bypass preceding stores. Nevertheless, program order among stores implies global memory order, and program order among loads also implies global memory order. Therefore, the stream of memory operations for a processing element may be split into a load stream and a store stream in one embodiment. Each stream may be considered to represent operations at a "virtual SC processing element" and may be termed a "virtual SC operation stream" herein. Virtual clocks may be maintained for each node in the two streams to limit the edges traversed during each iteration of applying rules B6 and B7. It is noted that edges between loads and succeeding stores (in program order) may also be added when using the split streams; i.e., some edges may lead from one stream to the other.

FIG. 7 is a flow diagram illustrating aspects of the operation of analysis module 120 according to one embodiment where vector clocks are employed. Analysis module 120 may divide the memory operation sequence for each processing element into two virtual SC operation streams, a load stream and a store stream, as indicated in block 701. A reverse time vector clock may be maintained for each node in the two streams in one embodiment, where each reverse time vector clock includes an entry for each of the virtual SC processing element streams (block 706). (The phrase "reverse time" may be used because entries of the vector clock identify earliest nodes that a node precedes in global memory order at other processing elements, rather than latest nodes that precede the node; and a reverse topological sort of the graph may be used to populate the vector clock entries.) Thus, for example, in one embodiment, if the multithreaded test were executed on P processing elements, each node's reverse time vector clock contains (2*P) entries, one entry each for loads and stores for each processing element. Static and observed edges may be added by analysis module 120 in accordance with rules A1-A5 as described above (block 711). Analysis module 120 may add inferred or backtrack edges iteratively and check for cycles, where the number of edge traversals may be limited or reduced using the reverse time vector clock entries (block 716), e.g., in accordance with the pseudo-code provided below. In addition, the values for the reverse time vector clocks may be updated for one or more nodes during each iteration. The use of vector clocks in this fashion may represent a tradeoff that may improve total analysis runtime at the cost of additional memory to store the vector clock values for each node.

The following high-level description and pseudo-code describes how the application of rules B6 and B7 may be modified in embodiments employing vector clocks. The notation x.RTVC[ ] represents a reverse time vector clock structure for a node x, and entry x.RTVC[j] represents the entry for processing element "j" within x.RTVC[ ].

```
// Input: Two virtual SC operation streams for each processing element,
// one consisting of only loads and one consisting of only stores; and a
// function w that maps a load to the store which created its value
// Data Structure: A reverse time vector clock (RTVC[ ]) at each node x
```

```
-continued

// of the virtual SC operation streams; x.RTVC[j] points to the first node
// in the virtual SC operation stream j such that
// x precedes x.RTVC[j] in global memory order. RTVC[ ] for each
// node is computed using reverse topological sort.
// Add inferred edges iteratively (rules B6 and B7)
do
    for each store S
        for each virtual SC operation stream j
            x = S.RTVC[j];
            if (x is a load) then
                find L, the first load that accesses same location as S,
                    where x.pro.L and w(L) differs from S;
                // Apply rule B6
                add edge from S to w(L) if S.glo.(w(L)) is not already
                    true;
                update S.RTVC[ ];
            else // x is a store
                find S', the first store that accesses same location as S,
                    where x.pro.S';
                // Apply rule B7
                for all loads L such that w(L) = S
                    add edge from L to S' if L.glo.S' is not already
                        true;
                    update L.RTVC[ ];
                end for
            end if
        end for
    end for
until no more edges can be added.
```

Verifying Implementations of Transactional Memory

Transactional memory is a design concept for scalable multiprocessors which offers efficient lock-free synchronization and simplifies parallel software. However, given the issues involved with concurrency and atomicity, it is important that transactional memory systems be carefully designed and aggressively tested to ensure their correctness. In one embodiment, an axiomatic framework to model the formal specification of a transactional memory system which may contain a mix of transactional and non-transactional operations is described. Using this framework and extensions to the above described analysis algorithms for verifying memory consistency, pseudo-random testing methodology may be effectively applied to transactional memory systems.

The shared memory programming model is very popular for parallel architectures in part because it is relatively easy to use compared to message passing models. However proper synchronization between processes must be employed to ensure correct behavior; such synchronization is normally used to provide mutual exclusion between different execution streams via acquisition and release of locks. Unfortunately, lock-based synchronization has a number of disadvantages. To solve these problems, an implementation called transactional memory has been proposed which can be used to provide atomicity in the context of a multiprocessor. In transactional memory systems, programmers may define a customized block of code called a transaction whose operations appear as if they have either executed atomically or never executed.

While transactional memory (TM) may provide for a simpler programming model, it also may generally impose a greater burden on the system designer. TM implementations may require several complexities like transaction caches, speculative writes, atomic reads and writes to hardware state, commit broadcasts, and so on. Given the difficulties involved with preserving ordering and atomicity guarantees to the programmer, while still allowing a high degree of parallelism for good performance, aggressive verification is desired to ensure that such systems work reliably. The pseudo-random testing methodology used extensively by commercial microprocessor and system design teams cannot be extended easily to tests with unordered transactions or instructions which access shared memory locations. Such tests may produce multiple outcomes which are legal under the system specification, and it is not obvious how legal and illegal results can be distinguished from each other.

In one embodiment, a transactional memory program may have both transactional and non-transactional memory operations. Further, non-transactional operations are governed by traditional memory consistency rules, except that they may not intervene operations within a transaction in the global order. This may model a realistic multiprocessor system since it is likely that a system with support for transactions will still need to support existing non-transactional code for that instruction set architecture, as long as the memory locations accessed by transactional and non-transactional instructions are nonintersecting. Transactional memory systems which require that all instructions be part of a transaction represent a special case. Reordering of instructions within a transaction may be possible but may not be visible to programmers. Whether consecutive transactions on the same processors may be reordered is an optional constraint. Only committed transactions are important for the purposes of verification of architectural results, since aborted transactions are assumed to have no programmer-visible effect on memory. Similarly a nested transaction may be treated as a single transaction since that is how they appear to a programmer. While the Total Store Order (TSO) memory model is used for purposes of discussion, other models like SC (Sequential Consistency) and PSO (Partial Store Order) can be incorporated using a similar framework.

In addition to the above described notation, the following are added: [Op] represents a transactional load or store on any processor to any memory, and [$Op_i$; $Op_j$] represents a transaction consisting of the (not necessarily consecutive) operations $Op_i$ and $Op_j$, where $Op_i$ precedes $Op_j$. The following are the additional axioms for a TM system employing the TSO memory model for non-transactional operations:

TransOpOp: Program order within a transaction implies global order.

TransMembar: Memory barriers are implicit around each transaction. (This is optional.)

TransAtomicity: No other memory operations can intervene between two consecutive operations in a transaction.

Value: The value returned by a load is the value written to it by the last store in global order, amongst the set of stores preceding it in either global order or program order. This version of the Value axiom allows optimizations allowed by the TSO memory model (a load can see the result of a store on the same processor before that store has completed in global order); however, it is also correct for a system using only transactions or for a system with sequentially consistent semantics for non-transactional operations.

All of the above axioms together specify the behavior of a TM system using TSO semantics for non-transactional operations. The TransAtomicity, TransOpOp, TransAtomicity, Order, Termination and Value axioms completely specify a transactions-only system (without explicit memory barriers and inbuilt atomic swap operations) like TCC, while the Order, Atomicity, Termination, Membar, LoadOp, StoreStore and Value axioms specify a traditional multiprocessor system based on the TSO memory model.

In the following described embodiments, a method for verifying a transactional memory is described which generally includes three steps.

Step 1: Generate Test Program. A pseudo-random multi-processor test program with both transactional and non-transactional operations is generated. In one embodiment, the test program access a relatively small number of shared memory addresses. Transactional and non-transactional operations may be controlled to access non-intersecting set of addresses if desired. The test case is instrumented to observe the architectural results of running the test, such as the value read by each non-transactional load instruction or each load instruction in a committed transaction. On a real system, or in a hardware emulation environment, these results can be buffered in processor registers in order to minimize test perturbation, and only flushed to memory when the register buffer gets full. In some simulated systems, the simulation environment has a means to obtain these architectural results without any instrumentation overhead. To minimize overhead, value written by every generated store instruction may be statically determinable so that they do not have to be explicitly stored as part of the results. Various properties of the generated program such as instruction mix, statistical distribution of transaction length, number of shared memory addresses, sequences of instruction patterns, etc. may be controlled by the user.

In addition, the test generator needs to be aware of the specific types of instructions of the TM system, e.g. the mechanism to begin, commit or abort a transaction, but may otherwise be fairly portable. For a transaction which aborts, the test case may retry the transaction. In one embodiment, a test which fails to complete before a timeout may indicate failure to make forward progress and is considered an error. The test can include all operations (including non-transactional operations) supported by the instruction set. For example, for a typical instruction set architecture, it would include different-sized loads and stores, compare and swap, prefetches, flushes, conditional branches, non-faulting loads, inter-processor interrupts, non-cacheable operations, etc. In order to map each read value observed in the program back to the store which created it, each store value used in the program is unique.

Step 2: Run Test. The test program from step 1 is run on a test environment such as an actual multiprocessor system or a simulation model at, for example, the architectural, RTL (Register Transfer Level) or gate-level.

Step 3: Perform Analysis. The architectural results of the test program are fed into an analysis algorithm. In one embodiment, the analysis algorithm may be oblivious to the specifics of the TM system, as long as it has a description of the dynamic order of all operations (including transaction boundaries) that were committed and the values read/written by all loads and stores. No other visibility into the test execution is assumed, nor any specifics about how the TM system is implemented. However, additional ordering information may be used if it is available. At the end of analysis, a pass or fail is signaled. Since it is possible that different runs of the same test program may obtain different results in the presence of external perturbation, the analysis result refers to the correctness of only that particular run of the test program.

To prepare for analysis, the dynamic sequence of program instructions on each processor is converted to a sequence of nodes in a graph. In one embodiment, transactions which aborted do not appear in the graph since they should have no programmer-visible effect. Nodes representing instructions which do not have programmer visible effect on memory such as prefetches and flushes may be converted to no-ops. Compare and swap instructions are resolved into either a swap or an ordinary load. Nodes representing instructions which cover multiple shared words of interest are expanded, so that all loads, stores and swaps in the analysis graph are of a uniform size. Finally, edges are added in this graph to represent constraints on the global memory order according to the analysis algorithm described in the next section. Note that global memory order is a perceived memory order rather than order in terms of actual time.

In one embodiment, the analysis algorithms try to infer as many orders as possible between memory operations that must hold to satisfy program order, and to justify the observed behavior. A directed graph may be used as the data structure for the analysis. Nodes in the graph represent operations and edges represent ordering relations in the global memory order. Since global memory order is transitive, any path in the graph implies the existence of the global memory order relation between the source and destination of the path. A violation of any axioms in Section 2 (excluding the Termination axiom) will cause a conflict in the ordering of two or more operations and manifest as a cycle in the graph.

A global source node at the root of the graph acts like a set of stores writing initial values to all shared addresses. It is ordered before all other nodes in the graph. TransAtomicity Enforcement is one aspect of the analysis algorithm with respect to transaction atomicity: incoming edges incident to any node in a transaction must point to its first node; outgoing edges from any node in a transaction must similarly leave from its last node. This guarantees that the TransAtomicity axiom is satisfied by the relations embodied in the graph at all times.

In one embodiment, the analysis algorithm begins by mapping every load value to the store which wrote that value. This mapping is well-defined because, as noted above, every store in the test writes a unique value. A load reading a value never written to that address causes an obvious failure at the outset. After this step, the algorithm adds any edges implied by knowledge of global ordering obtained through additional observability available in the system, if any. For example in a hybrid hardware-software TM system, software may be able to record some global ordering information. Next, the analysis algorithm adds edges by applying the following rules.

Baseline Algorithm

Static Edges: In the first step, program order edges are added to the graph according to the following 6 rules, which depend only on the test program and are independent of run results. The first three rules are related to transactions. The next three capture TSO ordering requirements for non-transactional operations.

Rule T1: [Op1; Op2] implies Op1.glo.Op2 (derived from TransOpOp axiom)

Rule T2: Op1; [Op2] implies Op1.glo.Op2 (derived TransMembar axiom)

Rule T3: [Op2]; Op3 implies Op2.glo.Op3 (TransMembar axiom)

Rules A1-A7 are as above.

Rule A1: L.pro.Op implies L.glo.Op (derived from the LoadOp Axiom)

Rule A2: S.pro.S' implies S.glo.S' (derived from the Store-Store Axiom)

Rule A3: S.pro.M.pro.L implies S.glo.L (derived from the Membar Axiom)

For the remaining rules, let S, S', and L be accesses to the same address.

Observed Edges: For all loads, the edges specified by the following two rules are added based on the load results. These edges can be added once load values are known.

Rule A4: If S does not precede L in per processing element program order, this implies S.glo.L (derived from Value axiom, which requires that the load must read the value last written in global memory order, so if S does not precede L on the local processor, it must precede L in global memory order)

Rule A5: S'.pro.L implies S'.glo.S (also derived from the Value axiom. If S' precedes L on the local processor, but L reads the value written by S, then S' must precede S in global memory order.)

Inferred edges: In the last step, we add more edges based on two rules which follow from the Value axiom:

We define VTM-read and VTM-conflict in a similar way to VTSO-read and VTSO-conflict. And similarly, we use rules A6 and A7 for VTM-conflict and B6 and B7 for VTM-read.

Rule A6: S.glo.S' (according to the total write order for the memory location written by S and S')

Rule A7: S.glo.S' implies L.glo.S' for all L reading the value written by S (derived from the Value axiom. This rule enforces the Value axiom by ensuring that S must be the most recent store in global order for L because every store ordered after S will also be ordered after L. Only the S' that immediately follows S in the total write ordering for that location need be considered in applying this rule).

Figure 8:
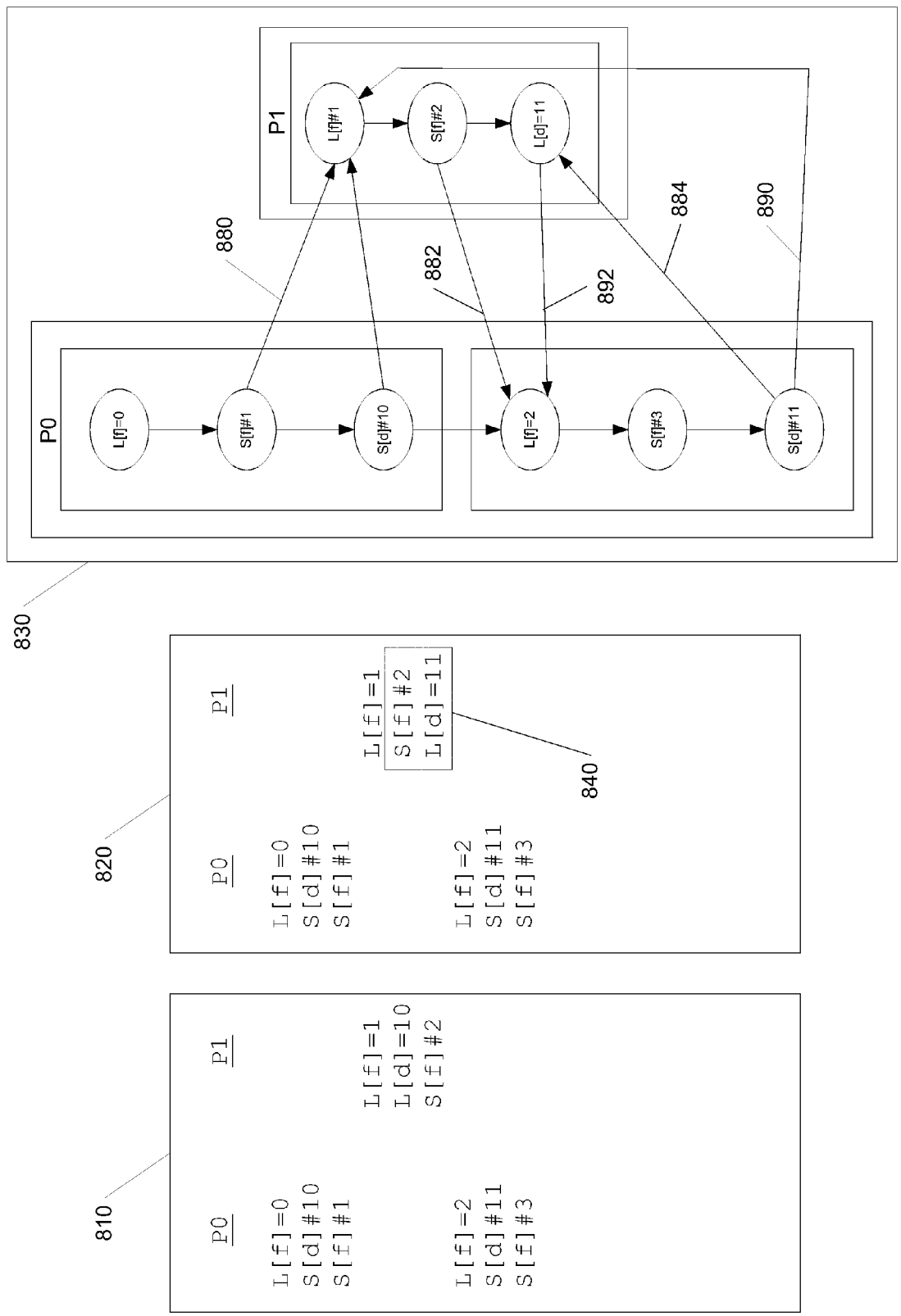
FIG. 8 illustrates analysis in a transactional memory model.

Turning now to FIG. 8, an illustration is provided of a producer-consumer synchronization with a single producer (P0) and a single consumer (P1). This synchronization can be achieved without locks: the producer checks the flag (L[f]=0), produces data (S[d]#10), and sets the flag (S[f]#1); the consumer checks the flag (L[f]#1), consumes the data (L[d]#10) and reset the flag (S[f]#2). However, this lock-free mechanism relies on the premise that accesses to data and flag shall not be reordered, either by hardware or software (e.g. due to a programmer mistake). With transactional memory, the ordering constraint in software can be overlooked by embedding the critical sections in transactions. This makes programming TM systems less error-prone. The notation for this and the rest of examples is as follows:

S[a]#1 refers to a store which writes value 1 to location.

L[b]=2 refers to a load from location b which returns value 2.

Block 810 in FIG. 8 shows code where data (location d) and flag (location f) are accessed in the correct order. An example of possible outcomes is annotated with the code sequence. In block 820, code is shown where the consumer accesses the data and flag in the opposite order. Under the TSO model, this code may produce undesirable yet valid results, such as that exhibited in the annotation 840. Embedding this same code in transactions, however, precludes such undesirable results. Block 830 shows why the result shown in block 820 are not valid under the TM model. As seen in block 830, a cycle (marked as 890 and 892) is created by TransAtomicity Enforcement on dashed edges 880, 882, 884 derived via rule A4. Generally speaking, the method depicted in FIG. 6a may also apply to VTM-read & VTM-conflict problems. In such a case, block 601 additionally includes adding static edges by rules T1-T3.

In the absence of cycles in the graph, our algorithm creates a global order relation which is consistent with all the axioms except the Order axiom. As a result, some operations may be left unordered potentially hiding some unresolvable ordering conflicts which should have been flagged as a violation of the Order axiom. This incomplete algorithm therefore runs the risk of letting erroneous results go undetected. To address this incompleteness, the final graph attained by the baseline algorithm is post-processed in order to discover a valid Total Operation Order (TOO) which satisfies all axioms. A topological sort is performed and an order is arbitrarily assigned to operations that are left unordered by the baseline algorithm.

Each time an arbitrary ordering choice is made, a repeat inference of further constraints due to rules B6 and B7 is determined until a new fixed point is reached. It is possible that the topological sort may get stuck due to an incorrect choice made earlier. When this happens, a backtrack to the last choice point is performed and a different choice made. As described above, data structures are carefully maintained such that the effect of the choice can be undone as well as further constraints which were inferred based upon that choice. Note that TransAtomicity Enforcement always applies during this post processing phase and the algorithms view a whole transaction as a single node. A transaction can be selected for retirement in global order only if all operations within it are ready for retirement. Similarly, when undoing the effect of an arbitrarily picked transaction, the effect of all operations in that transaction may be undone.

Figure 9:
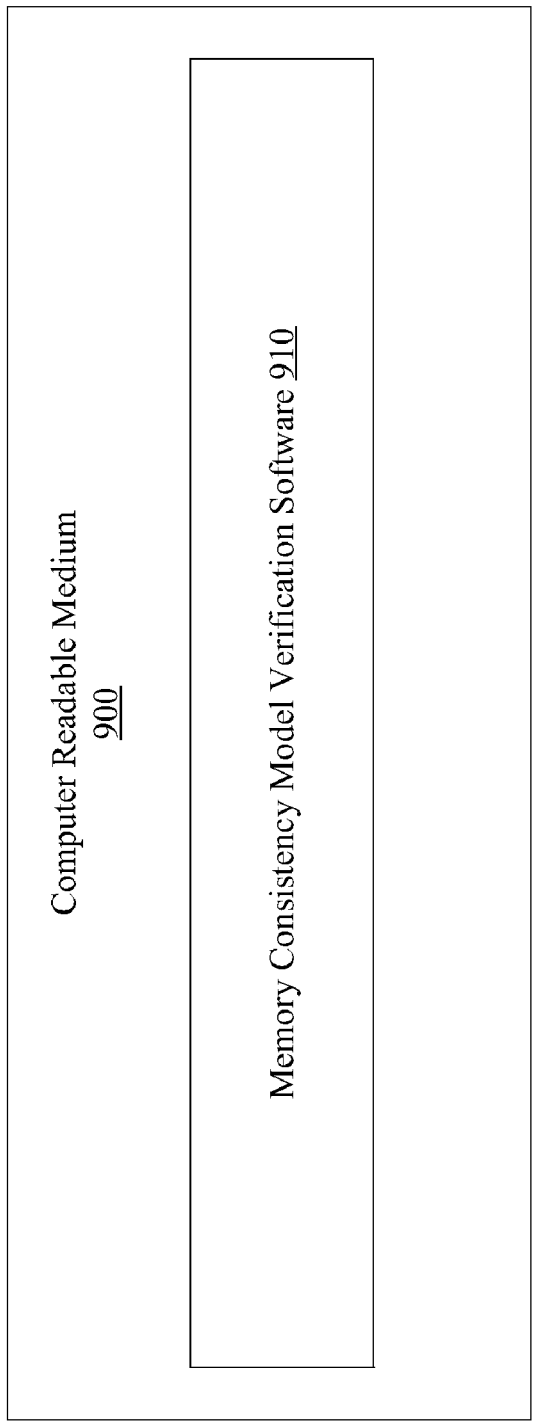
FIG. 9 is a block diagram of one embodiment of a computer readable medium.

FIG. 9 is a block diagram of one embodiment of a computer readable medium 900, comprising memory model consistency verification software 910 including instructions which, when executed, implement the functionality of test module 110 and analysis module 120 described above. Various components of the test module 110 (e.g., test generator 112 and execution coordinator 114) and/or analysis module 120 may be packaged together as a single software program, or packaged in any combination in different embodiments. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc,. In addition to storage media, other embodiments may include non-storage media such as media accessible via transmission media or signals such as electrical, electromagnetic, or digital signals, conveyed via a communication medium such as a network and/or a wireless link. It is noted that portions or all of test module 110 and/or analysis module 120 may be implemented in hardware and/or firmware in some embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a test module operable to coordinate execution of a test program on a test platform; and
   an analysis module, wherein the analysis module is configured to:
   represent memory operations performed during the execution as nodes of a directed graph;
   add edges to the directed graph representing ordering relationships between the memory operations;
   traverse one or more existing edges of a directed graph, starting from a first node of the directed graph, to infer whether an additional edge is to be added to the directed graph;
   perform a backtracking procedure to return to a prior choice point and make an alternate choice, if additional edges are not inferred; and detect that a memory consistency model is violated if a cycle is found in the directed graph.

2. The system as recited in claim 1, wherein the analysis module is further configured to:
utilize a first set of rules to verify that results of the execution correspond to a valid ordering of events, if the test platform provides an indication of an order in which writes from multiple processing elements of a plurality of processing elements are performed at a shared memory location during the execution; and
utilize a second set of rules to verify that the results correspond to a valid ordering of events, if the test platform does not provide an indication of the order.

3. The system as recited in claim 2, wherein the analysis module is further operable to utilize transactional memory axioms to verify the memory consistency model.

4. The system as recited in claim 3, wherein said transactional memory axioms are selected from a group consisting of: a program order within a transaction implies global order; memory barriers are implicit around each transaction; and no other memory operations can intervene between two consecutive operations in a transaction.

5. The system as recited in claim 2, wherein, if the test platform does not provide an indication of the order, the analysis module is further configured to:
use a heuristic based on a possible write order at each shared memory location of a plurality of shared memory locations to determine whether the results correspond to a valid ordering of events according to the memory consistency model.

6. The system as recited in claim 1, wherein the test platform includes a simulation model of a multiprocessor system.

7. The system as recited in claim 1, wherein the test platform includes a multiprocessor system.

8. The system as recited in claim 1, wherein the test module is further configured to generate a multithreaded test program.

9. The system as recited in claim 8, wherein the test module is further configured to include a mix of instructions in the multithreaded test programs in accordance with user-specified input parameters.

10. The system as recited in claim 8, wherein each write operation included in the multithreaded test program writes a distinctly identifiable value.

11. A method, comprising:
coordinating an execution of a multithreaded test program on a test platform including a plurality of processing elements;
representing memory operations performed during the execution as nodes of a directed graph;
adding edges to the directed graph representing ordering relationships between the memory operations;
traversing one or more existing edges of a directed graph, staffing from a first node of the directed graph, to infer whether an additional edge is to be added to the directed graph;
performing a backtracking procedure to return to a prior choice point and make an alternate choice, if additional edges are not inferred; and
detecting that a memory consistency model is violated if a cycle is found in the directed graph.

12. The method as recited in claim 11, further comprising:
if the test platform provides an indication of an order in which writes from multiple processing elements of the plurality of processing elements are performed at a shared memory location during the execution, using a first set of rules to verify that results of the execution correspond to a valid ordering of events according to a memory consistency model; and
if the test platform does not provide an indication of the order, using a second set of rules to verify that the results correspond to a valid ordering of events according to the memory consistency model.

13. The method as recited in claim 12, further comprising utilizing transactional memory axioms to verify the memory consistency model.

14. The method as recited in claim 13, wherein said transactional memory axioms are selected from a group consisting of: a program order within a transaction implies global order; memory barriers are implicit around each transaction; and no other memory operations can intervene between two consecutive operations in a transaction.

15. The method as recited in claim 11, further comprising:
if the test platform does not provide an indication of the order, using a heuristic based on a possible write order at each shared memory location of a plurality of shared memory locations to determine whether the results correspond to a valid ordering of events according to the memory consistency model.

16. A computer readable storage medium comprising software instructions, wherein the software instructions are executable by a processor to:
coordinate an execution of a multithreaded test program on a test platform including a plurality of processing elements;
represent memory operations performed during the execution as nodes of a directed graph;
add edges to the directed graph representing ordering relationships between the memory operations;
traverse one or more existing edges of a directed graph, starting from a first node of the directed graph, to infer whether an additional edge is to be added to the directed graph;
perform a backtracking procedure to return to a prior choice point and make an alternate choice, if additional edges are not inferred; and
detect that a memory consistency model is violated if a cycle is found in the directed graph.

17. The computer readable storage medium as recited in claim 16, wherein the instructions are further executable to:
if the test platform provides an indication of an order in which writes from multiple processing elements of the plurality of processing elements are performed at a shared memory location during the execution, use a first set of rules to verify that results of the execution correspond to a valid ordering of events according to a memory consistency model; and
if the test platform does not provide an indication of the order, use a second set of rules to verify that the results correspond to a valid ordering of events according to the memory consistency model.

18. The computer readable storage medium as recited in claim 17, wherein the instructions are further executable to utilize transactional memory axioms to verify the memory consistency model.

19. The computer readable storage medium as recited in claim 18, wherein said transactional memory axioms are selected from a group consisting of: a program order within a transaction implies global order; memory bafflers are implicit around each transaction; and no other memory operations can intervene between two consecutive operations in a transaction.

20. The computer readable storage medium as recited in claim 16, wherein the instructions are further executable to:

if the test platform does not provide an indication of an ordering of events, use a heuristic based on a possible write order at each shared memory location of a plurality of shared memory locations to determine whether a result of execution corresponds to a valid ordering of events according to the memory consistency model.

* * * * *